Oct. 11, 1938.     M. K. KUHLMANN     2,132,856
EARSCREW
Filed March 28, 1938
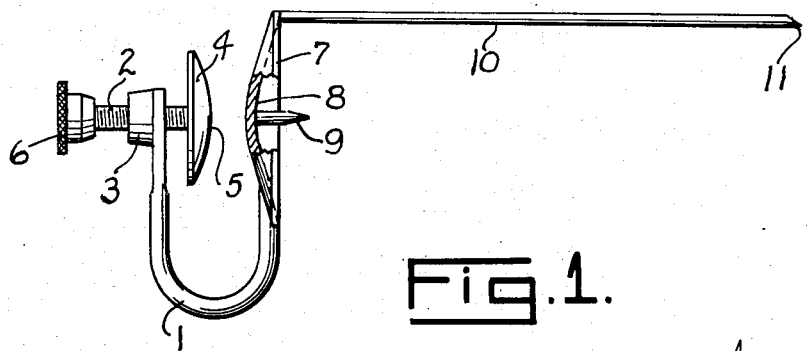
Fig. 1.
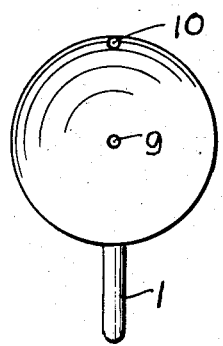
Fig. 2.
Fig. 3.
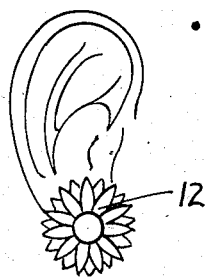
Fig. 4.
Inventor:
Marie Kessler Kuhlmann
Jesse R. Stone
&
Lester B. Clark
Attorneys Patented Oct. 11, 1938

2,132,856

UNITED STATES PATENT OFFICE 2,132,856

EARSCREW

Marie Kessler Kuhlmann, Kerrville, Tex.

Application March 28, 1938, Serial No. 198,447

4 Claims. (Cl. 63—14)

The invention relates to earscrews and similar ornamental pieces of jewelry and has particular reference to the attachment to the same of an ornamental object such as a fresh flower.

It is the object of the invention to provide means of attachment to the piece of jewelry a flower or the like in such way that the attaching means will be practically invisible.

It is an object of the invention to provide a cup-shaped recess resembling the calyx of a flower or flowers, into which the flower or flowers may be placed and firmly secured so that the same will appear to be a part of the setting.

It is a further object of the invention to provide attaching means of the flower to the support which may be used repeatedly with different flowers and in which the attaching means may be concealed by the flower itself.

With reference to the drawing herewith, Fig. 1 is a side view in elevation with certain parts broken away for greater clearness.

Fig. 2 is a front elevation of the device.

Fig. 3 is a side elevation showing the flower secured in position on the support.

Fig. 4 shows the flower and support attached in position to the ear of the wearer.

While the invention is capable of application to various pieces of jewelry and may include the use of more than one flower, the invention has been illustrated in connection with an ear screw having one flower attached thereto.

In the drawing is shown an earscrew of ordinary construction but modified by the use of the invention therewith. A U-shaped frame or support member 1 is employed, the inner arm of the U-shaped support having a threaded opening therethrough to receive the screw member 2. Adjacent the threaded opening the support member has been flattened out and a reenforcing bushing 3 is formed thereon, thus providing a substantial support for the screw 2.

The screw is formed with a head 4 thereon the inner and forward end of which is rounded as at 5 to contact with the ear of the wearer. The outer end of the screw is equipped in the usual manner with a knurled disc, by means of which the screw may be manipulated.

On the forward arm of the U-shaped support 1 is formed a concave plate 7, the concave surface 8 of which is presented forwardly and it is to be understood that this plate may be formed in the contour of the calyx of a flower. It forms a support within which the flower is seated so that the corolla of the flower will be presented on the forward side of the ear.

Centrally of the plate 7 and axially of the plate is formed a forwardly projecting prong or post 9 which is sharpened at the forward end so that a flower may be impaled thereon.

At the upper margin of the plate 7 and projecting forwardly therefrom is a flexible attaching member 10. This attaching member is preferably a wire of the proper length to engage about the base of the flower and may be of various lengths. It is preferred to sharpen the forward end of this attaching member as shown at 11 so that it may penetrate the flower.

In the use of this device a flower such as is shown at 12 in Fig. 3 is severed from the stem so that the base 13 of the flower will fit within the artificial calyx formed by the plate 7. The portion 13 of the flower will be impaled upon the post 9, thus securing the flower in position so that the corolla of the flower will be presented toward the observer in such manner as to be clearly visible while the support is concealed. While the flower will be held in position fairly firmly in this manner, it is usually necessary to employ the flexible attaching member 10 and in doing this the wire is wound about the base of the flower and may be threaded through the projecting leaves on the rearward side of the flower so as not to be clearly visible. The end 11 of the wire is finally inserted into the body of the flower itself, thus concealing it from sight.

When thus mounted in place, the means by which the flower is supported is practically invisible as shown in Fig. 4. Furthermore, the flower is so firmly attached to the support that it cannot become loosened by ordinary wear.

The concave plate 7 may, as previously stated, be made to represent the calyx of the flower and when so formed it may project around its margin from the body of the plate and be formed with sepals thereon to imitate the calyx.

It will be obvious that where fresh flowers are used in this manner a new flower must be attached each time that the device is used. The old flower may be easily removed by unwinding the flexible member 10 and a new flower quickly attached in its place. The device has the advantage over ordinary means for supporting flowers that the attaching means is invisible after the flower is secured in place and the upper portion of the support may form an ornamental background for the flower supported thereon.

I wish it to be understood that various changes may be made in the structure of the attaching means as may be desired insofar as the modifications come within the scope of the appended claims.

What is claimed as new is:

1. An ear screw comprising a support, means to attach said support to the ear of the wearer, a concave plate on said support, a central prong on said plate over which a flower may be impaled, and a flexible forwardly extending member to engage about and penetrate the body of a flower to retain it impaled upon said prong.

2. In an ear screw or the like, a cup shaped plate, a prong projecting forwardly axially of said plate, and a flexible attaching wire formed on the margin of said plate.

3. In an ear screw or the like, a cup shaped plate, a prong projecting forwardly axially of said plate, and a flexible attaching wire formed on the margin of said plate, said margin being formed to resemble the calyx of a flower.

4. In an ear screw or the like a supporting plate, a forwardly projecting prong thereon over which a flower may be impaled, and a flexible wire attached to the plate in spaced relation with said prong and adapted to engage and tie a flower in position on said prong.

MARIE KESSLER KUHLMANN.